(12) United States Patent
Duerr et al.

(10) Patent No.: US 7,424,330 B2
(45) Date of Patent: Sep. 9, 2008

(54) METHOD AND APPARATUS FOR CONTROLLING DEFORMABLE ACTUATORS

(75) Inventors: Peter Duerr, Dresden (DE); Ulric Ljungblad, Moelndal (SE)

(73) Assignees: Fraunhofer-Gesellschaft zur Foerderung der angewandten Forschung e. V., Munich (DE); Micronic Laser Systems AB, Täby (SE)

( * ) Notice: Subject to any disclaimer, the term of this patent is extended or adjusted under 35 U.S.C. 154(b) by 657 days.

(21) Appl. No.: 11/028,963

(22) Filed: Jan. 4, 2005

(65) Prior Publication Data

US 2006/0018048 A1   Jan. 26, 2006

Related U.S. Application Data

(63) Continuation of application No. PCT/EP02/07441, filed on Jul. 4, 2002.

(51) Int. Cl.
G05B 11/01 (2006.01)
(52) U.S. Cl. ............... 700/19; 700/11; 359/290; 359/291; 359/318
(58) Field of Classification Search ............ 700/11, 700/19; 359/290–291, 318
See application file for complete search history.

(56) References Cited

U.S. PATENT DOCUMENTS

| 5,096,279 | A |   | 3/1992  | Hornbeck et al. |         |
|-----------|---|---|---------|-----------------|---------|
| 5,706,123 | A | * | 1/1998  | Miller et al.   | 359/291 |
| 5,835,336 | A | * | 11/1998 | Knipe et al.    | 361/233 |
| 6,885,493 | B2| * | 4/2005  | Ljungblad et al.| 359/290 |
| 7,013,183 | B1| * | 3/2006  | Solomon         | 700/11  |
| 7,283,112 | B2| * | 10/2007 | Starkweather et al. | 345/84 |

FOREIGN PATENT DOCUMENTS

| DE | 4224600 A1 | 1/1994 |
| EP | 0793129 A2 | 9/1997 |
| WO | WO 02/063371 A1 | 8/2002 |

OTHER PUBLICATIONS

Schenk, Harald et al.; "Driving Systems for Micromechanical Optical Scanning Mirrors"; Elektronik; Nov. 30, 1999; pp. 54-56, 58; vol. 48, No. 24; XP000947453; ISSN 0013-5658; Weka-Fachzeitschriften, Germany.

* cited by examiner

*Primary Examiner*—Alexander J Kosowski
(74) *Attorney, Agent, or Firm*—Harness, Dickey & Pierce, P.L.C.

(57) ABSTRACT

In order to prevent negative effects of imprinting an the addressing accuracy of deformable actuators, a method for controlling deformable actuators has, during an event period, driving the first and the second deformable actuator for causing the deformable actuators to assume a first and a second deformation state, respectively; and, before or after the event period, driving the first and the second deformable actuator for causing the deformable actuators to assume deformations states to counteract an imprinting caused during the event period by approximating the loads applied to the deformable actuators to each other. According to an embodiment, before or after the event period, for a period substantially as long as the operation period, the first and the second deformable actuator are driven such that the first deformable actuator assumes the second deformation state and the second deformable actuator assumes the first deformation state.

13 Claims, 3 Drawing Sheets

METHOD AND APPARATUS FOR CONTROLLING DEFORMABLE ACTUATORS

CROSS-REFERENCE TO RELATED APPLICATION

This application is a continuation of and claims priority to co-pending International Application No. PCT/EP02/07441, filed Jul. 4, 2002, and is incorporated herein by reference in its entirety.

BACKGROUND OF THE INVENTION

1. Field of the Invention

The present invention relates to a method and an apparatus for controlling deformable actuators such as cantilever beam micromirror elements of a micromirror array, and, in particular, relates to an improved addressing scheme for multiple micromechanical actuators that reduces or even eliminates the negative effect of imprinting on the operation of the actuators.

2. Description of the Related Art

Imprinting is a cumulative material effect that limits the performance of micromechanical actuators and occurs, for example, for actuators made of aluminum and aluminum based alloys. The imprinting effect manifests itself by a gradually increased change of the actuator position when all parameters are kept constant in the deflected state. It further manifests itself by curing out when the actuator is left in the non-deflected state for a sufficient amount of time. Both, the build-up and the curing out are non-linear effects. The resulting position at a given time thus depends not only on the addressing force at that time, but also on the history of deflection or deformation of this particular actuator element. Therefore, the response of the actuator becomes inaccurate unless the actuator is used as a two-state-actuator switching from one of two states to the other with the states being defined by stops.

One example where imprinting has a negative effect on the behaviour of multiple actuators are cantilever beam micromirrors as used in spatial light modulators (SLM). FIG. 5 schematically shows two exemplary micromirror elements 50a and 50b of a SLM micromirror array. Each of the micromirror elements 50a and 50b comprises an actuator element 52a and an address electrode 54a and 54b, the actuator element 52a and 52b and the address electrode 54a and 54b facing each other over a gap 56a and 56b. Each actuator element 52a, 52b is supported by a deflectable portion 58a and 58b so as to be deformable or deflectable into the gap 56a and 56b, respectively, the deflected state of the actuator elements 52a', 52b' being shown by dashed lines, and the non-deflected state being sown by solid lines. Each actuator element 52a and 52b serves as an electrode and is connected to a driver terminal 60 to which a common driver signal is applied. Each address electrode 54a and 54b is connected to a different address terminal 62a and 62b to which one of two address signals or voltages is applied in order to cause the actuator elements to assume one of two deformation states. More particularly, due to the huge number of elements in a micromirror array, the deformation state of each micromirror element 50a and 50b is adjusted serially before each. SLM flash. Data defining the deflection states of each micromirror element 50a and 50b is written to memory cells each corresponding to one of the micromirror elements 50a and 50b, by a demultiplexer during a so called programming time. After programming the data stored in the memory cells is applied to address terminals 62a and 62b of the micromirror elements 50a and 50b thereby changing the deformation states of the micromirror elements 50a and 50b or leaving same unchanged.

In order to achieve a high reflectivity of the micromirror elements 50a and 50b, they are preferably made of aluminium so that imprinting occurs.

The operation of the above micromirror array can be controlled in different ways. The operation of the above actuators of FIG. 5 according to a simple realisation and the occurrence of imprinting as well as the problems related thereto are discussed with reference to FIG. 6. FIG. 6 shows two graphs being arranged in registration, one on top of the other. The X axis of both graphs represent the time in arbitrary units. The Y axis of the upper graph represents voltage U in arbitrary units. The Y axis of the lower graph represents force F or the amount of deformation d in arbitrary units. In the upper graph, an example for a signal course or waveform of the potential or signal applied to the addressing electrode 54b of the actuator element 50b is shown by a narrowly dashed line, a signal course or waveform of the potential applied to the addressing electrode 54a of the actuator element 50a is shown by a dotted line, and a signal course of the potential applied to the driving terminal 60 is shown by a widely dashed line.

According to FIG. 6 the deflection states of the micromirror elements 50a and 50b are controlled directly by the addressing signals which are, as discussed above, set to the data stored in corresponding memory cells after each programming cycle thereby changing the deflection state of each micromirror element 50a and 50b or not. As can be seen, in the example of FIG. 6, the potential being applied to the addressing electrodes 54a and 54b is constant but different during the time shown in FIG. 6. In particular, the potential of addressing electrode 54a is equal to a first potential or voltage level $U_1$ corresponding to a first deflection state, and the potential of addressing electrode 54b is equal to a second potential $U_2$ corresponding to a second deflection state. No change in the deflection state has occurred. The potential applied to the driver terminal 60 is fixed and is equal to the potential of the addressing electrode 54a.

In the lower graph, the force acting on and the deformation experienced by the actuator elements 52a and 52b, respectively, is shown, wherein the narrowly dashed line corresponds to actuator element 52b while the dotted line corresponds to actuator element 52a. As can be seen from FIG. 6, the actuation principle of the micromirror elements 50a and 50b is based on an electrostatic attraction between the respective addressing electrode 54a and 54b and the actuator element 52a and 52b, respectively. If the addressing electrode 54a, 54b, is set to the first potential U1 no force is acting whereas, when setting the addressing electrode 54a, 54b, to a second potential, the electrostatic attraction deflects or deforms the actuator element 52a and 52b. During operation of the micromirror array, the different actuator elements 52a and 52b develop a different amount of imprinting due to their different deformation states they assume during operation. This results in a different behaviour of these actuator elements in the further operation of these actuator elements resulting in an inaccurate light modulation.

The key for improved performance is that the accurate actuator position is only needed during a very short event. For example, when a micromirror array having the micromirror elements of FIG. 5 is used together with a laser beam in, for example, maskless optical direct writing, the position of the accurate actuators is only important during a laser flash indicated in FIG. 6 by reference number 70 and 72, respectively. The repetition period of this event might be long compared to this short event. For example, in case of a micromirror array being used for printing, most of the time is used for programming the desired control values to the multitude of actuator elements. These control values are, thereafter, as described above, serially written to memory cells and then applied to the addressing electrodes of the micromirror elements. In case of the simple addressing scheme of FIG. 6 in which the deformation state of the micromirror elements is directly controlled by the potentials applied to the addressing electrodes which are changed only after each programming cycle this leads to a bad ratio between the time (event times) in which the deflection of the mircomirror elements is necessary and the time (non-event times) in which no deflection is needed.

An addressing scheme that avoids unnecessary deformation of the actuator elements during non-event times and thus reduces the mean deflection of the actuators is described in the Swedish Patent Application SE01003667 with the title "Addressing Method and Apparatus using the same". In FIG. 7, one version of such an improved addressing scheme is shown, wherein this version is described in the following with regard to the micromirror elements of FIG. 5. Similarly to FIG. 6, two graphs are shown, the upper one of which has an Y axis representing voltage U in arbitrary units, the lower one of which has an Y axis representing force F or deformation d in arbitrary units. The X axis are in registration and represent time t in arbitrary units. In the upper graph, exemplary signal courses for the potentials of the addressing electrode 54b of the micromirror element 50b, the actuator elements 52a and 52b and the addressing electrode 54a of the micromirror element 50a are shown by narrowly dashed, widely dashed and dotted lines, respectively.

Deviating from the simple addressing scheme of FIG. 6, according to the addressing scheme of FIG. 7 the deflection state of each micromirror element is firstly defined in a programming cycle during which each element is not deflected and then triggered by varying the common driver signal from a first to a second potential during the event times thereby deflecting the micromirror elements as defined by the addressing signals being applied. Thus, the time the micromirror elements experience deflection is limited to the event times by varying the common driving signal thereby acting directly and concurrently on all micromirror elements without substantially disturbing the potential difference between the addressing electrodes of the micromirror elements as defined by the preprogrammed control values. Thus, the common driver signal is used as a trigger for the deflection of the micromirror elements during event times.

As can be seen in FIG. 7, the potential exemplarily being applied to the addressing electrodes 54a and 54b is constant. In particular, the potential of addressing electrode 54a is equal to the first potential $U_1$, and the potential of addressing electrode 54b is equal to a second potential $U_2$. The potential applied to the driver terminal 60 is equal to a third potential $U_3$ that is a mean potential between potentials $U_1$ and $U_2$, during non-event times 78. During event times, the potential applied to the driver terminal 60 is set to the potential $U_1$.

In the lower graph, resulting forces acting on, or deformations experienced by, actuator elements 52b, 52a are shown by dashed and dotted lines, respectively. In non-event times 78, the potential difference between the addressing electrodes 54a and 54b and the actuator elements 54a and 54b, respectively, is only half compared to the addressing scheme according to FIG. 6, thus creating only one quarter of the force. Moreover, the force and deflection during non-event times 78 is the same for the actuated actuator element 52b, the addressing electrode voltage of which equals the second potential $U_2$, and the non-actuated actuator element 52a, the addressing electrode voltage of which equals the first potential $U_1$. Only during the short event times indicated at 80 and 82, the actuator elements 52a and 52b experience different amount of deflection. In particular, during event times 80, 82, the actuator potential set to the second potential $U_2$ creates the full force for the actuated element 52b, whereas the actuator potential set to the first potential $U_1$ creates no force for the non-actuated element 52a, thereby creating the desired difference of the actuator element positions. Thus, the mean load of the actuator elements is greatly reduced compared to the addressing scheme of FIG. 6. In particular, the difference between deflected and non-deflected actuator elements is cancelled for the biggest part of the operation time, the programming time 78.

However, during the event time, the pixels of the micromirror array are deflected very differently, which is, of course, on the one hand, the desired effect of the actuators but has, on the other hand, negative effects on the addressing accuracy.

SUMMARY OF THE INVENTION

It is the object of the present invention to provide a method and an apparatus for controlling a first and a second deformable actuator so that the addressing accuracy is increased.

In accordance with a first aspect, the present invention provides an apparatus for controlling a first and a second deformable actuator, having: driving means being operative in operation cycles having a programming period, an event period and a non-event period, and being configured to, in each operation cycle, during the programming period, cause the first and second deformable actuator to assume an idle deformation state, during the event period, cause the first deformable actuator to assume a first deformation state and cause the second deformable actuator to assume a second deformation state, and, before or after the event period during the non-event period, cause the deformable actuators to assume deformations states to counteract an imprinting caused during the event period thereby approximating the loads applied to the deformable actuators during the operation cycle to each other.

In accordance with a second aspect, the present invention provides a method for controlling a first and a second deformable actuator in operation cycles having a programming period, an event-period and a non-event period, the method having, in each operation cycle, the following steps: during the programming period, causing the first and second deformable actuator to assume an idle deformation state; during the event period, causing the first deformable actuator to assume a first deformation state and causing the second deformable actuator to assume a second deformation state; and before or after the event period during the non-event period causing the deformable actuators to assume deformations states to counteract an imprinting caused during the event period thereby approximating the loads applied to the deformable actuators to each other.

The present invention is based on the finding that a reduction of addressing accuracy due inhomogeneity of imprinting occurring at different actuator elements can be achieved by providing an additional period before or after each event period during which the deformable actuators are driven such that same assume deformation states so as to counteract an imprinting caused during the event period, by approximating the loads applied to the deformable actuators to each other. By this measure the difference in loads experienced by the deformable actuators is reduced, thus reducing the negative imprinting effects and improving the addressing accuracy.

The additional period may by chosen as long as the event period, so that the effective time of load for the deformable actuators is the same during the event period and the additional period, thus facilitating the control of the deformation states during the additional periods.

Moreover, the additional periods may immediately follow or precede the additional periods thus so that the resulting history of deflection for each deformable actuator gets more similar, thereby facilitating the control of the deformation states during the additional periods.

According to an embodiment of the present invention, the negative effect of imprinting on the addressing accuracy of binary deformable actuators is substantially eliminated by driving two different actuator elements before or after the event time, i.e. the time the first actuator element has to assume a first deformation state and the second deformable actuator has to assume a second deformation state, for a period substantially as long as the event period, such that the first deformable actuator assumes the second deformation state and the second deformable actuator assumes the first deformation state. By this measure, the loads for each actuator is kept equal, thus preventing negative imprinting effects on the addressing accuracy. Moreover, the implementation does not require any changes in the design of the deformable actuators, and the time needed per operation cycle is increased only by a small extent, i.e. one event period.

In a special embodiment of the present invention in which the actuation principle is the electrostatic attraction between an addressing electrode and the actuator element, and in which the addressing electrode of the actuator elements is set individually to one of two potentials, and the driving potential of the actuator elements is commonly kept on a mean potential during programming time and driven to one of the two potentials during an event period, the developing of differences in imprinting between the actuator elements is prevented by setting the actuator element potential to the other of the two potentials for the same amount of time as the event period, before or after the event period. By this measure the affords for implementing the counteraction of the deformable actuators during the additional periods is limited to changing the control of the driving potential commonly for all deformable actuators.

One advantage of the present invention is that the invention is easy to implement in an existing system. Furthermore, no new technology or fabrication steps are required for implementing the present invention in existing systems. Existing actuators can easily be used with slightly modified addressing circuits.

BRIEF DESCRIPTION OF THE DRAWINGS

Preferred embodiments of the present invention are described in the following with reference to the figures, in which.

DETAILED DESCRIPTION OF EXEMPLARY EMBODIMENTS

The present invention is described in the following rather broadly with regard to FIG. 1 in order to explain the advantages of the present invention.

Figure 1:
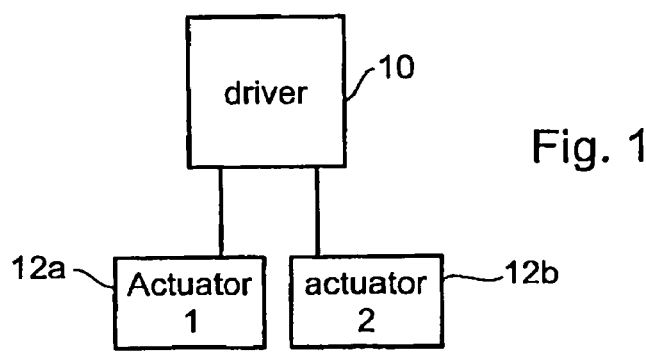
FIG. 1 is a schematic diagram of an embodiment of the present invention which shows two actuators driven by a driver.

FIG. 1 shows an arrangement in accordance with an embodiment of the present invention in which a driver 10 is connected to two deformable actuators 12a and 12b. Driver 10 is to drive the deformable actuators 12a, 12b to desired states during event times. The driver 10 is, for example, instructed by a processor (not shown). During non event times, the driver 10 drives the deformable actuators 12a, 12b to the same deformation states so that each deformable actuator experiences the same amount of deformation and imprinting. During the event times each deformable actuator 12a, 12b experiences a different amount of deformation, thereby developing different amount of imprinting and thus decreasing the addressing accuracy.

Figure 5:
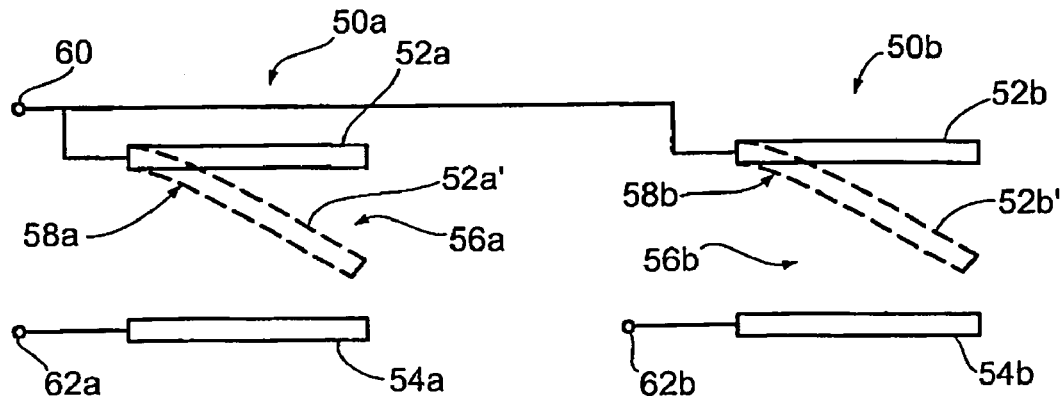
FIG. 5 is a schematic diagram showing two micromirror elements.

The actuation principle by which the actuators 12a and 12b are actuated is not limited to electrostatic attraction as shown in FIG. 5. Different actuation principles may be used as well such as magnetostatic or piezoelectric forces.

According to the invention, in order to approximate the loads applied to the first and second actuator 12a, 12b during operation to each other, additionally to the event period and the non-event times an additional period is provided, during which driver 10 drives the deformable actuators 12a, 12b in order to counteract the imprinting caused during the event periods by approximating the loads applied to the first and the second deformable actuator to each other. Generally, during the additional period, the first and the second deformable actuator 12a, 12b is driven such that the deformable actuator that experiences less load during an event period is driven such that it experiences more load during the corresponding additional period.

For example, in case the deformable actuators 12a, 12b are binary actuators assuming one of two deformation states only, driver 10 drives the actuators 12a and 12b not only during event periods, but also during additional periods which are as long as the event period. During event periods, driver 10 drives the actuators 12a and 12b such that they assume their desired deflections state, whereby each actuator 12a and 12b develops a different amount of imprinting. Before or after each event period, during an additional period, driver 10 drives the actuators 12a and 12b such that each actuator 12a and 12b assumes the deflection state that is assumed by the other actuator 12b and 12a, respectively, during the event period. Thus, during both periods, the event period and the additional period, both actuators 12a and 12b assume the same deflection states for the same amount of time and thus experience the same load and develop the same amount of imprinting.

It is noted that the above description also applies to driving or addressing of more than two actuators. For example, in case the deformable actuators driven by driver 10 are of the binary type, i.e. adapted to assume one of two deflection states only, each of the actuators is driven such that it assumes, for the additional period as long as the event period, the deflection state different from that it assumes during the event period.

In case the actuators are driven to arbitrary deformation states or positions in a limited range during the event period, the range of arbitrary deformation positions might be divided into two ranges of deformation states, i.e. one subrange corresponding to more amount of deformation and one range corresponding to less deformation. Each actuator that assumes a deformation state out of one subrange during the event time is driven to assume another deformation state out of the other subrange during the additional period being as long as the event period. As opposed to the binary case, in the arbitrary-state case the difference between the amount of imprinting that the actuators experience is not completely eliminated but is at least reduced.

As described above, during non-event periods, i.e. when no event period and no additional period is present, driver 10 drives actuators 12a and 12b to the same idle deformation state. Thus, during non-event times, all actuators 12a and 12b experience the same amount of imprinting. In the above described binary case, this applies for a hole operation cycle including the event period, the non-event period and the additional period.

The idle deformation state may define the state when no deformation or load occurs. If the idle deformation state is a state where deformation occurs, it is possible to provide an additional actuation mechanism for acting on the deformable actuators 12a and 12b during the non-event time, in a reverse actuation direction opposite to that driver 10 is acting, thereby balancing the forces exerted on the deformable actuators 12a, 12b.

In case the deformation states of the deformable actuators 12a, 12b are directed in a main deformation or actuation direction only, the same or an further additional actuation mechanism may be used, to drive the deformable actuators during a further additional period in order to eliminate or reduce the imprinting developed by the deformable actuators 12a, 12b during the event and the additional period. For example, in case of binary deformable actuators being driven as described above, i.e. with changed deformation states during the additional period, an further additional period before, after or between the event and the additional period is provided during which the deformable actuators are driven the same way as in the event and additional period but in a reverse sense.

After having described the main principles of the present invention rather broadly with regard to FIG. 1 without specifically restricting the actuation mechanism of the actuators to a certain actuation principle or application, in the following, an more specific embodiment of the present invention is described in which the actuation principle is of electrostatic nature. Thus, when discussing the embodiment of FIG. 2 reference is also made to FIG. 1 wherein the embodiment of FIG. 2 shall be regarded as specialisation of that of FIG. 1.

Figure 2:
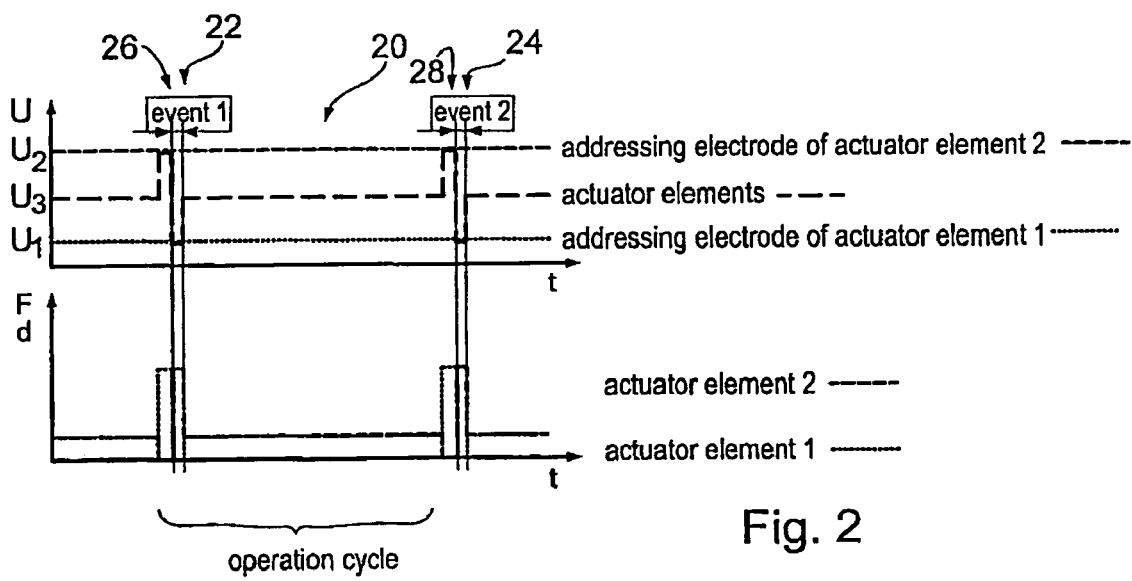
FIG. 2 shows two graphs illustrating the operation of the driver of FIG. 1 according to an embodiment of the present invention.

More specifically, FIG. 2 corresponds to an embodiment of the present invention where the actuators 12a and 12b the driver 10 is connected to are micromirror elements like those shown in FIG. 5. Thus, in the following, reference is also made to FIG. 5 wherein a repeated discussion of FIG. 5 is avoided. With regard to FIG. 1 it is noted that each connection between the driver 10 and the actuators 12a, 12b represents, for the following discussion, two separate connections, one for the common driver terminal 60 (FIG. 5) and the other for the addressing electrodes 62a and 62b.

FIG. 2 shows two graphs, the X axis of which are aligned to each other and represent time t in arbitrary units. The Y axis of the upper graph represents voltage U whereas the Y axis of the lower graph represents force F or deformation d applied to or experienced by actuator elements 52a and 52b of the micromirror elements 50a and 50b in arbitrary units. In the upper graph exemplary signal courses or waveforms for the potential applied to the addressing electrode 62b of the actuator element 52b, the potential applied to the actuator elements 52a and 52b and the potential of the addressing electrode 54a of the actuator element 52a are shown by narrowly dashed, widely dashed and dotted lines, respectively. In the lower graph, the resulting force or deformation acting on or experienced by the actuator element 52a and 52b are shown by dashed and dotted lines, respectively.

Figure 6:
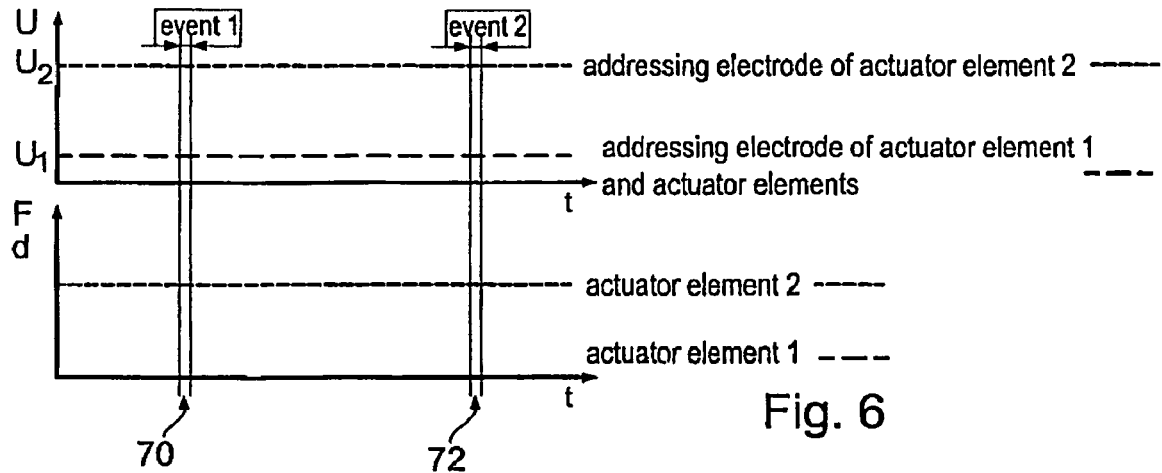
FIG. 6 shows two graphs illustrating a first conventional addressing scheme.

As described above, the actuator elements 52a and 52b are to assume one of two deformation states. Each deformation state corresponds to the addressing signals assuming one of two potentials $U_1$ and $U_2$, thereby resulting in an actuated state and a non-actuated state. The addressing signals are, as discussed previously with regard to FIGS. 6 and 5, intermittently set to control values serially stored in corresponding memory cells during a programming cycle. The address signals stay at one potential until the next programming cycle and either switch to the other or maintain at this potential according to the new control values. In the example of FIG. 2, addressing electrode 54b of the actuator element 52b is constantly maintained at potential $U_2$ during two subsequently operation cycles whereas the addressing electrode 54a of the actuator element 52a is constantly maintained at potential $U_1$ during two subsequently operation cycles.

Moreover, driver 10 controls the common driving signal/potential of the actuator elements 52a and 52b in order to commonly and concurrently trigger deflections of all micromirror elements 50a and 50b according to their preset addressing signals. In particular, during non-event times generally indicated by 20, the potential of the actuator elements 52a and 52b is maintained at a potential $U_3$ which is a mean potential between the potentials $U_1$ and $U_2$. During event times, driver 10 drives the potential of the actuator elements 52a and 52b to potential $U_1$.

In FIG. 2 two events 22 and 24 are shown. An event time is, for example, defined by a laser flash during a printing process. Immediately before each event period 22 and 24, during an additional period 26 and 28 as long as the event period 22 and 24, driver 10 drives the potential of the actuator element 52a and 52b to potential $U_2$. Thus, an operation cycle is defined by the sum of a programming time, the event period and the additional period.

As can be seen from the lower graph, in each event period 22 and 24 the actuator elements 52a and 52b are driven to assume the desired states, i.e. the actuated state for the actuator element 52b and the non-actuated state for the actuator element 52a, as preset by the addressing signals during programming period 20, and as triggered by the common driver signal during event periods 22 and 24. During the additional period 26 and 28, the deformation states assumed are switched, i.e. the actuator 52b is in the non-actuated state while actuator element 52a is in the actuated state. More specifically, the common driver signal is switched between two different potentials thereby commonly and concurrently switching the deformation states of the actuators as defined by the addressing signals and as triggered by the common driver signal.

During non-event times 20 both actuator elements 52a and 52b experience the same amount of deformation corresponding to a quarter of the actuated deformation state. Thus, during one operation cycle, both actuator elements are deformed equally, both with regard to time and force. Thus, by setting the actuator potential to the second value $U_2$ for the same amount of time as it is set to the first one $U_1$, the load for the different actuator elements 52a and 52b of a device, such as a micromirror array can be made completely equal, so that no differences in imprinting between the actuator elements 52a and 52b can develop any more.

It is noted that the force acting on actuator elements 52a and 52b during the programming time 20 can be balanced by providing a counter electrode that counteracts the electrostatic force due to the potential difference $U_2$–$U_3$ and $U_3$–$U_1$ during the programming time. By this measure, deflection or deformation is created only for a short time, i.e. during the events, and not at all for a long programming time 20.

It is noted that the addressing scheme shown in FIG. 2 also works with an offset. The actuator element potential may be different from the first, second or third potential $U_1$, $U_2$ and $U_3$, it might even be outside this range. For a given actuator element potential associated with the event period, another potential is chosen for the additional period that acts just in the reversed sense on addressed and non-addressed actuator elements. For example, assuming that potential $U_a$ is the potential applied to the actuator elements during event periods, and that potentials $U_1$ and $U_2$ be the addressing potentials, then the potential $U_b$ that is applied to the actuator elements during the additional period is chosen to be $U_b = U_1 + U_2 - U_a$. This way, the potential $U_b$ acts just in a reversed sense on addressed and non-addressed actuator elements relative to potential $U_a$.

Furthermore, it is noted that the additional periods may follow the even periods instead of preceding same.

Although the homogeneity of the imprinting is improved by the above addressing scheme of FIG. 2, it is noted that, in fact, imprinting still occurs and is even increased since now in each operation cycle each actuator element is deformed for a short time. But this imprinting that is common to all actuator elements can easily be taken into account to get a high precision addressing. An additional actuation mechanism such as the above mentioned counter electrode influencing all actuator elements in the same extent and opposite to the main actuation direction may be provided in order to balance the main actuation direction by acting on the actuator elements to deflect them away from the addressing electrodes. For example, the actuator elements are deflected away from the addressing electrodes during a extra period that follows, precedes or is between the event and the additional period and is as long as the event and the additional period together. During this extra period, the actuator elements are deflected by the same extend as during the event and additional period but in a reversed actuation direction. Thus, in combination with a balancing of the deflection during the non-event times as described above, the common imprinting can completely balanced, wherein the operation cycle is increased by just a small amount of time, i.e. three times the event period, i.e. one for balancing the load of actuated and non-actuated actuators and two for counteracting the imprinting in the main actuation direction.

With regard to FIG. 2 it is noted, that this embodiment is appropriate for use in a micromirror array having a huge number of micromirror elements to be controlled since the control of the deformation states is performed in two stages, one for setting the addressing signals during programming periods which are long compared to the event periods, and the other for varying the common driver signals during event and non-event periods, thereby commonly and concurrently controlling all micromirror elements according to their addressing signals applied. In case of a smaller number of actuators to be controlled it would be possible to control the deformation states of the actuators directly by varying their addressing signals during event and additional periods and keeping constant the common driver signal since, due to the smaller number of elements, no serially programming would be necessary. Thus, in this case it would be possible to deform the desired actuators just during the event periods and to leave them non-deformed during non-event periods. In a second step, those electrodes not being deflected during the event period could be deflected during the non-event periods. Alternatively, by use of a counter electrode the imprinting could be compensated directly by deflecting the actuators being deflected during event period in opposite sense during non-event period.

Figure 7:
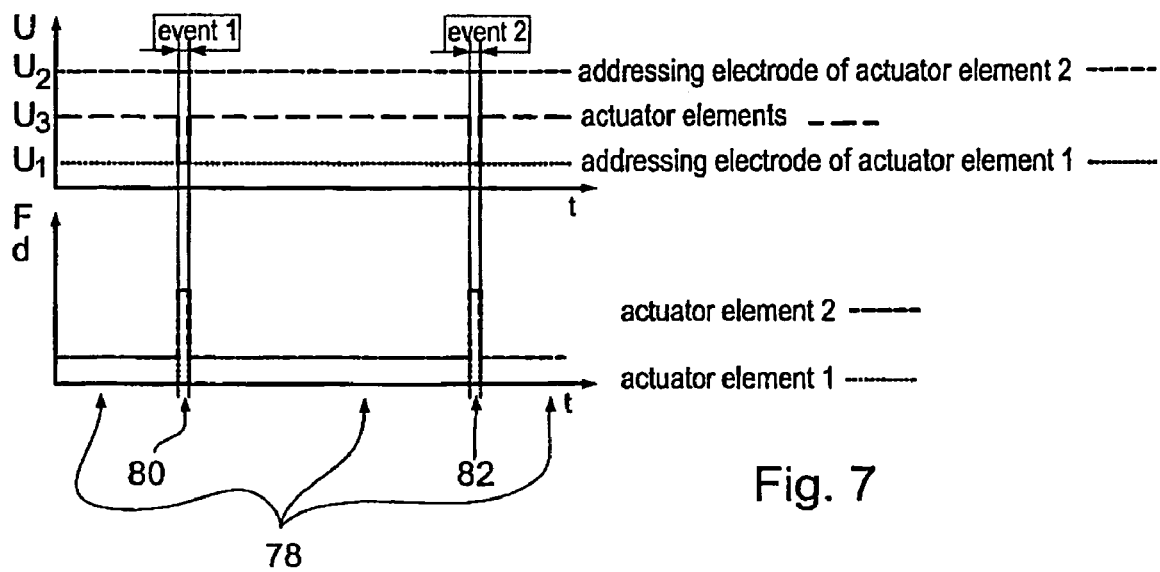
FIG. 7 shows two graphs illustrating a second conventional addressing scheme.

The addressing scheme of FIG. 2 is easy to implement even in an existing system. Only very little additional time is needed per operation cycle compared to the addressing scheme of FIG. 7. The load matching for all actuator elements is perfect. New technology or fabrication steps are not needed. Existing actuators can easily be used with slightly modified addressing circuits.

Although the present invention has been described above with respect to the addressing or controlling of the micromirror elements of FIG. 5, it is noted that the present invention is not limited to actuators of that type. Instead of electrostatic attraction, different actuation principles may be used such as magnetostatic or piezoelectric forces. Furthermore, the deformation of the deformable actuators is not limited to a cantilever-like deflection, but may also be a torsion or a dome like deformation, such as in microscanners or micromembrans. Accordingly, the actuators can be supported by any appropriate arrangement and are not limited to cantilevered actuators. Furthermore, it is noted that the present invention is not limited to the field of micromirror arrays. A possible other application filed is, for example, the microfluidic, in particular, microvalves and micropumps.

With regard to FIG. 2 it is noted that the micromirror elements shown therein are not limited to binary operation but could also be driven to arbitrary states in a range of deformation states. Additionally, with regard to FIG. 2 it is noted that in case the micromirror elements of FIG. 5 are driven to arbitrary states or positions in a limited range from a minimum to a maximum deformation state corresponding to a minimum Potential U1 and a maximum potential U2, the addressing scheme according to FIG. 5 would not eliminate but reduce the occurrence of imprinting. Thus, the addressing scheme of FIG. 2 is not limited to binary actuators but is also effective in case of arbitrary-state actuators.

Figure 3:
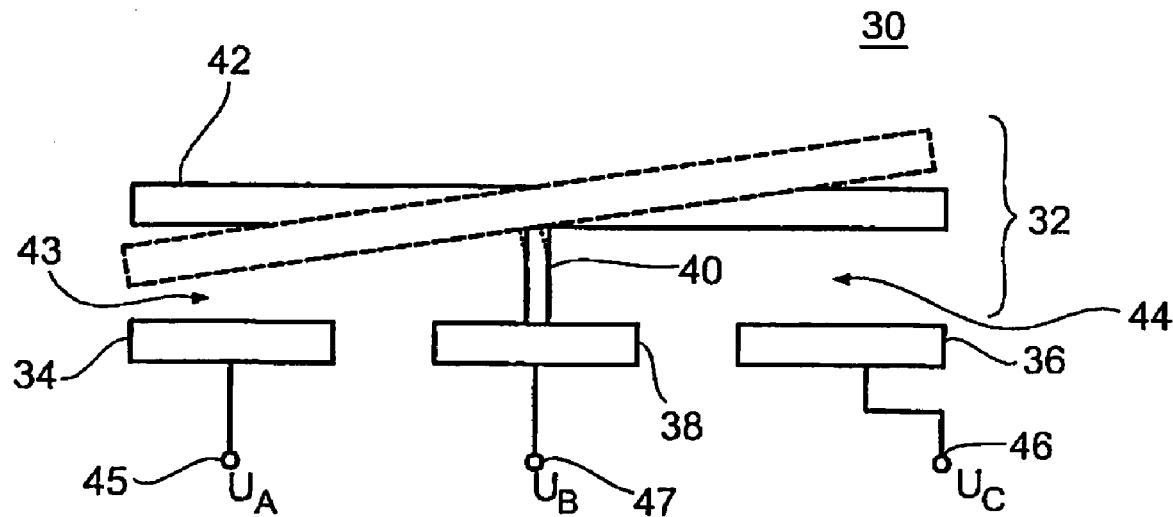
FIG. 3 shows schematically a cross section of a micromirror element according to another embodiment with analogue addressing.
Figure 4:
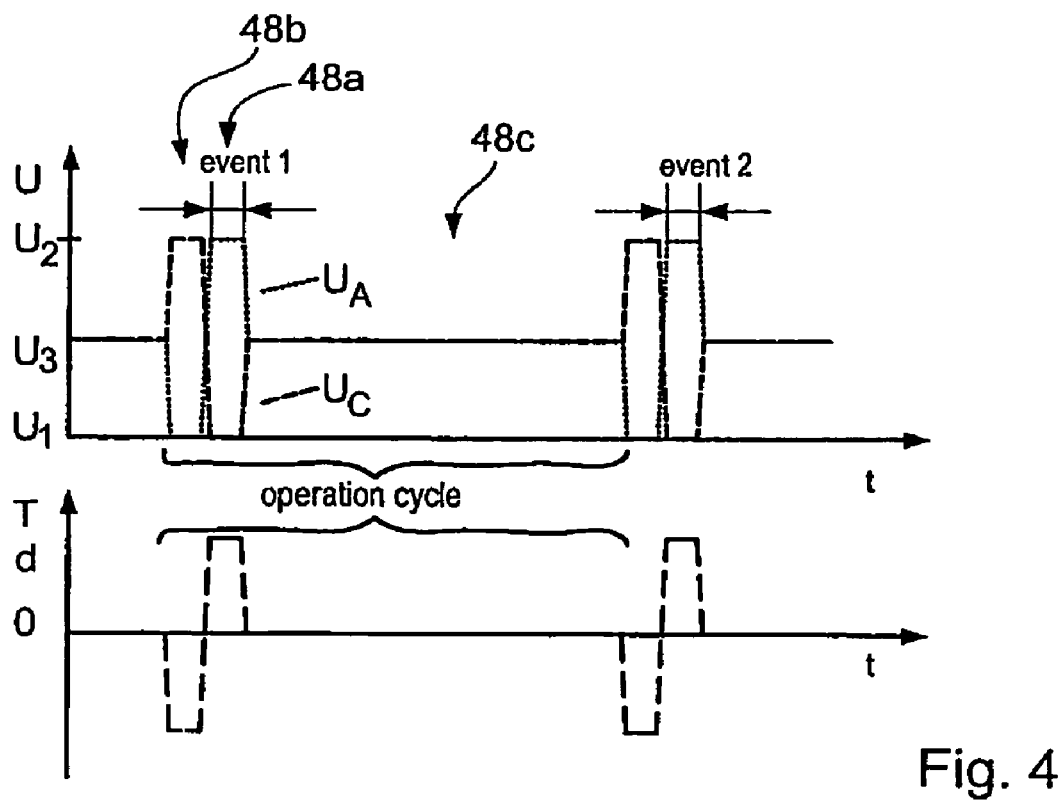
FIG. 4 shows two graphs illustrating the addressing scheme and the operation of micromirror element of FIG. 3.

With regard to FIGS. 3 and 4 an embodiment of the present invention is described which is advantageous over the foregoing embodiment of FIGS. 2 and 5 in that same is adapted to compensate imprinting in case of analog addressing. Like the embodiment of FIGS. 2 and 3, the following embodiment is exemplarily directed to a micromirror array having a plurality of micromirror elements with the actuation principle being of electrostatic nature. In order to allow for an analog addressing scheme a second common driver electrode is provided, the construction of the micromirror elements is modified and the arrangement of the electrodes is chosen as will be described in more details below.

FIG. 3 shows one micromirror element 30 together with its corresponding electrode arrangement. The micromirror element 30 comprises an actuator element 32, a first driver electrode 34, a second driver electrode 36 and an address electrode 38. The electrodes 34 to 38 are electrically isolated from each other. The actuator element 32 consists of a deformable support 40 and a rigid micromirror plate 42. A micromirror plate 42 and the deformable support 40 may be of the same material in which case the deformability of deformable support 40 is, for example, achieved by designing it thinner than the rigid micromirror plate 42, or of different material. In the following it is assumed that both, the plate 42 and the support 40, are made of aluminium so that imprinting occurs when the deformable support 40 is deflected from its idle position. The idle position is shown in FIG. 3 by solid lines.

As can be seen, the deformable support 40 is centrally fixed to the micromirror plate 42 and extends down from the micromirror plate 42 to the address electrode 38 so as to electrically connect the address electrode 38 to the micromirror plate 42. In lateral dimensions, the micromirror plate 42 for example has the form of a square, and the deformable support 40 is a rectangle, the Interface between the micromirror plate 42 and the deformable support 40 centrally extending from a front edge to a backward edge as viewed in FIG. 3. As can further be seen, the first and second driver electrodes 34 and 36 are symmetrically arranged on both sides of the address electrode 38 with respect to the deformable support 40. Therefore, in the idle state of the actuator element 32, the micromirror plate 42 on the one hand and the driver electrode 34 and 36 on the other hand face each other over a gap 43 and 44, respectively, the distance being defined by the height of the deformable support 40. Furthermore, due to the symmetry, the lever arm length for the electrostatic attraction force between electrode 34 and plate 42 and between electrode 36 and plate 42, respectively, is equalize. The electrode 34, 36 and 38 are, for example, formed as strips laterally extending from the front edge to the backward edge of the micromirror plate 42. The electrodes 34, 36 and 38 are connected to a first and a second driver terminal 45 and 46 and an address terminal 47, respectively. By appropriately applying common driving voltages $U_A$ and $U_C$ and an individual address voltage UH to the terminals 45 to 47 according to an addressing scheme to be described in the following with respect to FIG. 4 the actuator elements 32 can be deflected to an extent arbitrarily adjustable, i.e. the in arbitrary units rather than two states only. A deflected state of the actuator element 42 is shown in FIG. 3 by dotted and dashed lines.

As noted above, FIG. 3 shows one micromirror element 30 of a micromirror array having a plurality of such micromirror elements. Each of these micromirror elements has a first and a second driver electrode and an address electrode. Each of these first and second driver electrodes 34 and 36 is connected to the same common signals $U_A$ and $U_c$, respectively. The addressing voltage $U_B$ is individually adjusted for each micromirror element in arbitrary units to a preprogrammed value in a range from a minimum to a maximum voltage. The preprogrammed voltage values U$ for each micromirror element are determined during the programming time and are serially applied to the respective addressing electrodes as described above. In particular, the micromirror element 30 of FIG. 3 is designed such that the extent to what the deformable support 40 is deformed depends on the difference or ratio between $U_A-U_B$ and $U_C-U_B$. Thus, no deformation takes place when UB is $(U_A-U_C)/2$, i. e. the mean value of $U_A$ and $U_C$, or $U_A$, or when $U_c$ are equal to each other. The greater the difference the higher the extent of deflection is.

After having described construction of the micromirror element 30 and the arrangement of its corresponding electrodes its Operation is described with respect to FIG. 4 which shows the addressing scheme. FIG. 4 shows two graphs, the upper one of which has an y axis representing voltage U in arbitrary units, the lower one of which has an y axis representing the torque T and thus the deflection d of the actuator element 32 in arbitrary units. The x axis are in registration and represent time in arbitrary units. The upper graph merely shows an exemplary portion of signal courses of the voltages $U_A$ and $U_C$ applied to the driving electrode 34 and 36. In particular, the voltage $U_A$, applied to the driving electrode 34 is shown by dotted line, and the voltage $U_C$ applied to the second driving electrodes 36 is shown by a dashed line. As can be seen, similarly to the embodiment of FIG. 2, each operation cycle is divided up into three periods, i.e. the event period 48a, the additional period 48b and the programming time 48c.

According to the addressing scheme of FIG. 4, both driving voltages $U_A$ and $U_C$ are set to a mean voltage value $U_3$ during programming time 48c. During event period 48a, driving voltage $U_A$ is set to a voltage value $U_2$ while driving voltage $U_c$ is driven to voltage value $U_1$, with voltage value $U_3$ being the mean value between $U_1$ and $U_2$. During the additional period 48b, driving voltages $U_A$ and $U_C$ are switched so as for voltage $U_A$ to assume the voltage value $U_1$ and the driving voltage $U_C$ to assume the voltage value $U_2$.

As can be seen from the lower graph, due to the symmetric arrangement of driving electrodes 34 and 36 and the symmetric construction of the actuator element 32, setting both driving voltages $U_A$ and $U_C$ to the Same voltage value $U_3$ during programming time 48C assures that during this period 48C no deflection of the actuator element 32 occurs irrespective of the individual addressing voltage $U_B$ applied to micromirror plate 42. Thus, as shown in FIG. 4, no torque T and no deflection D exists during programming time 48C. This applies for all micromirror elements of the micromirror array during programming time.

The situation changes during periods 48a and 48b since during these periods the voltages $U_A$ and $U_C$ applied to the symmetrically arranged driving electrodes 34 and 36 are different from each other. Thus, for all micromirror elements for which, during the programming time 48c, the addressing voltage $U_B$ was programmed to a voltage value different from $U_3$ the electrostatic attraction between the micromirror plate 42 and the driving electrode 34 on the one hand and between the micromirror plate 42 and the driving electrodes 36 on the other hand is different form each other, thus resulting in a torque acting on or in a deflection of actuator element 32. The magnitude of the torque T and thus deflection d during event period 48a depends on the addressing voltage $U_B$ of the respective micromirror element. Thus, full analog addressing is possible during programming time 48c. For all micromirror elements 32 in which the addressing voltage $U_B$ is set to a voltage value $U_3$ no deflection occurs during event period 48a since in this case both electrostatic attractions, i.e. between electrode 34 and plate 42 and between electrode 36 and plate 42, due to potential difference $U_B-U_A$ and $U_B-U_C$: respectively, are equal to each other.

However, due to the symmetric arrangement as explained above with respect to FIG. 3 and due to the fact that driving voltages $U_A$ and $U_C$ are merely switched between additional period 48b and event period 48a, in the additional period 48b the extent of electrical attraction between the micromirror plate 42 and the driving electrode 32 with 34 on the one hand and the micromirror plate 42 and the driving electrode 36 on the other hand is merely switched. Thus, the magnitude of torque T and deflection d is the same during event period 48a and additional period 48b, the only difference being the sign or direction of deflection. Thus, imprinting occurring during event period 48a is completely compensated for each micromirror element during the additional period 48b being as long as the event period. Advantageously, the capacitive coupling between the common signals $U_A$ and $U_C$ and the address voltage $U_B$ cancels due to symmetry of the arrangement of FIG. 3. Furthermore, the address voltage swing is only half of the effective drive voltage. Thus, the embodiment of FIG. 3 and 4 is appropriate for compensating the imprinting in case of an analog operation of the actuator elements.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for controlling a first and a second deformable actuator, comprising:
 a driver being operative in operation cycles comprising a programming period, an event period and a non-event period, the driver being configured to, in each operation cycle,
  during the programming period, cause the first and second deformable actuator to assume an idle deformation state,
  during the event period, cause the first deformable actuator to assume a first deformation state and cause the second deformable actuator to assume a second deformation state, and,
  before or after the event period during the non-event period, cause the deformable actuators to assume deformations states to counteract an imprinting caused during the event period thereby approximating the loads applied to the deformable actuators during the operation cycle to each other; wherein
  the first deformable actuator is controllable by the difference between a first address signal and a driving signal, the second deformable actuator is controllable by the difference between a second address signal and the driving signal, and wherein the driver comprises,
  an adjuster for, during the programming period, adjusting the first and the second address signal to a first and a second address value; and
  a driver for driving the driving signal to a first driving value during the event period thereby causing the first deformable actuator to assume the first deformation state and the second deformable actuator to assume the second deformation state and, during the non-event period, driving the driving signal to a second driving value which is adapted such that the deformable actuators assume deformations states to counteract an imprinting caused during the event period thereby approximating the loads applied to the deformable actuators to each other.

2. The apparatus according to claim 1, wherein the driver is configured to, during the non-event period, cause the deformable actuators to assume deformations states to counteract an imprinting for a period substantially as long as the event period.

3. The apparatus according to claim 1, wherein the driver is configured to, during the non-event period, cause the first deformable actuator to assume the second deformation state and the second deformable actuator to assume the first deformation state.

4. The apparatus according to claim 1, wherein the driver is adapted such that the non-event period immediately precedes or follows the event period.

5. The apparatus according to claim 1, further comprising:
 a compensator for compensating the deformation caused by the deformation state of the first and the second deformable actuator during the non-event time such that no deformation takes place during the non-event time.

6. The apparatus according to claim 1, further comprising:
 at least one memory cell corresponding to the first and second deformable actuator, respectively, wherein the driver is configured to, during the programming period, adjust the first and the second address signal to a first and a second address value in accordance with control values stored in the storage.

7. The apparatus according to claim 1, wherein the second driving value is equal to the sum of the first and the second address value minus the first driving value.

8. The apparatus according to claim 7, wherein the driver is adapted such that the first and the second address values are either a value corresponding to an actuated state or a value corresponding to a non-actuated state, and wherein the first driving value is one of the values of the actuated state and the value of the non-actuated state and the second driving value is the other of the value of the actuated state and the value of the non-actuated state.

9. The apparatus according to claim 1, wherein the driver further comprises:
 a driver for, during the programming period, driving the first and the second driving signal to a mean driving value which is the mean value between the first and the second driving value.

10. The apparatus according to claim 1, wherein each of the first and the second deformable actuators comprises:
 an addressing electrode for receiving the first and the second address signal, respectively; and
 an actuator element for receiving the driving signal, the actuator element being supported by a deformable portion thereof wherein the first and the second address signal and the driving signal correspond to respective voltage levels.

11. The apparatus according to claim 10, wherein the driver is adapted such that the first and the second address values are either a value corresponding to an actuated or a value corresponding to a non-actuated state, and wherein the first driving value is one of the values of the actuated state and the value of the non-actuated state and the second driving value is the other of the value of the actuated state and the value of the non-actuated state, wherein each of the first and the second deformable actuators comprises,
 a counter electrode configured to be biased to a balancing potential during the programming period, for causing an electrostatic force between the actuator element and the counter electrode which is substantially equal to an electrostatic force between the actuator element and the first and second address electrode, respectively.

12. An apparatus for controlling a first and a second deformable actuator, comprising:
 a driver being operative in operation cycles comprising a programming period, an event period and a non-event period, the driver being configured to, in each operation cycle,
  during the programming period, cause the first and second deformable actuator to assume an idle deformation state,
  during the event period, cause the first deformable actuator to assume a first deformation state and cause the second deformable actuator to assume a second deformation state, and,
  before or after the event period during the non-event period, cause the deformable actuators to assume deformations states to counteract an imprinting caused during the event period thereby approximating the loads applied to the deformable actuators during the operation cycle to each other; wherein the first deformable actuator is controllable by a first address signal and a first and a second driving signal, the second deformable actuator being controllable by a second address signal and the first and the second driving signal, the extent of deformation of the first deformable actuator depending on the difference of the difference between the first addressing signal and the first driving signal and the difference between the first address signal and the second driving signal, and the extent of deformation of the second deformable actuator depending on the difference of the difference between the second address signal and the first driving signal and the difference between the second address signal and the second driving signal, and wherein the driver for driving the first and the second deformable actuator comprises,
- an adjuster for adjusting a first and a second address signal to a first and a second address value; and
- a driver for driving the first driving signal to a first driving value and the second driving signal to a second driving value different from the first driving value during the event period thereby causing the first deformable actuator to assume the first deformation state and the second deformable actuator to assume the second deformation state and, before and after the event period, driving the first driving signal to the second driving value and the second driving signal to the first driving value.

13. A method for controlling a first and a second deformable actuator in operation cycles comprising a programming period, an event-period and a non-event period, in each operation cycle, the method comprising:

- during the programming period, causing the first and second deformable actuator to assume an idle deformation state by adjusting the first and the second address signal to a first and a second address value;
- during the event period, causing the first deformable actuator to assume a first deformation state and causing the second deformable actuator to assume a second deformation state by driving the driving signal to a first driving value; and
- before or after the event period during the non-event period, driving the driving signal to a second driving value, the second driving value being adapted such that the deformable actuators assume deformations states to counteract an imprinting caused during the event period, the driving of the driving signal to the second driving value causing the deformable actuators to assume the deformations states to counteract the imprinting caused during the event period, thereby approximating the loads applied to the deformable actuators to each other; wherein
- the first deformable actuator is controllable by the difference between a first address signal and a driving signal, the second deformable actuator is controllable by the difference between a second address signal and the driving signal.

\* \* \* \* \*